United States Patent [19]

Brasseux

[11] 4,422,218
[45] Dec. 27, 1983

[54] LEVER-TYPE LOAD BINDER
[75] Inventor: Gerald G. Brasseux, Abbeville, La.
[73] Assignee: Dominion Chain Inc., Ontario, Canada
[21] Appl. No.: 141,975
[22] Filed: Apr. 21, 1980
[51] Int. Cl.³ .............................................. B66F 3/00
[52] U.S. Cl. ................................. 24/68 CT; 24/270; 254/255
[58] Field of Search .......... 24/68 CT, 68 CD, 69 CT, 24/69 T, 69 WT, 71 R, 71 T, 71 ST, 71 TT, 71 LT; 254/255

[56] References Cited

U.S. PATENT DOCUMENTS

| | | | |
|---|---|---|---|
| 1,277,296 | 8/1918 | Curtner | 24/69 TT |
| 1,510,035 | 9/1924 | Bradley | 254/120 |
| 1,514,024 | 11/1924 | Stacy | 24/270 |
| 1,911,194 | 5/1933 | Jenkins | 24/270 |
| 2,500,488 | 3/1950 | Durbin et al. | 24/270 |
| 2,555,660 | 6/1951 | Russell | 24/270 |
| 2,945,274 | 7/1960 | Paterson | 24/68 T |
| 3,119,278 | 1/1964 | Simpson | 74/524 |
| 3,271,007 | 9/1966 | Ratcliff | 254/78 |
| 3,395,892 | 8/1965 | Ratcliff | 254/79 |
| 3,591,141 | 7/1971 | Ratcliff | 254/78 |
| 3,826,469 | 7/1974 | Ratcliff et al. | 24/270 |
| 3,842,426 | 10/1974 | Ratcliff et al. | 24/270 |

FOREIGN PATENT DOCUMENTS 2807539  8/1979  Fed. Rep. of Germany .
1335362 10/1973  United Kingdom .

Primary Examiner—James A. Leppink
Assistant Examiner—Hoang C. Dang
Attorney, Agent, or Firm—Burns, Doane, Swecker & Mathis

[57] ABSTRACT

A lever-type load binder is disclosed in which the necessary force to draw the ends of the binder together is provided by a pivoting lever element. The binder employs a handle for tensioning and releasing the binder. The handle and lever element are constructed so that the handle positively engages the lever element to pivot the lever element on the tensioning stroke. However, the handle is employed merely to trigger the release stroke by rotating the lever element through dead center while the handle is out of the path of travel of the lever element. Because of this feature, the user is not endangered by a "flyback" of the handle when the binder is released.

13 Claims, 9 Drawing Figures

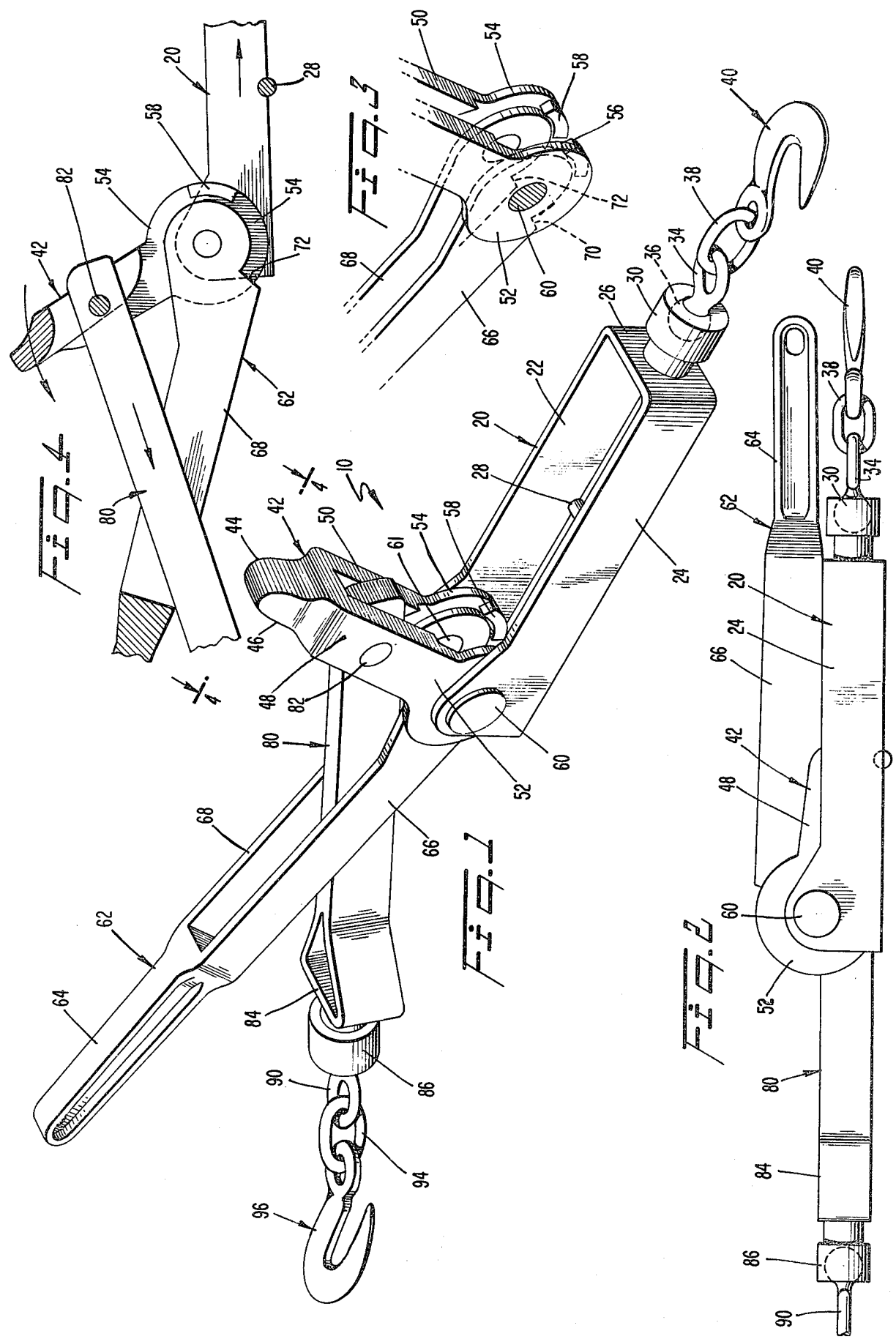

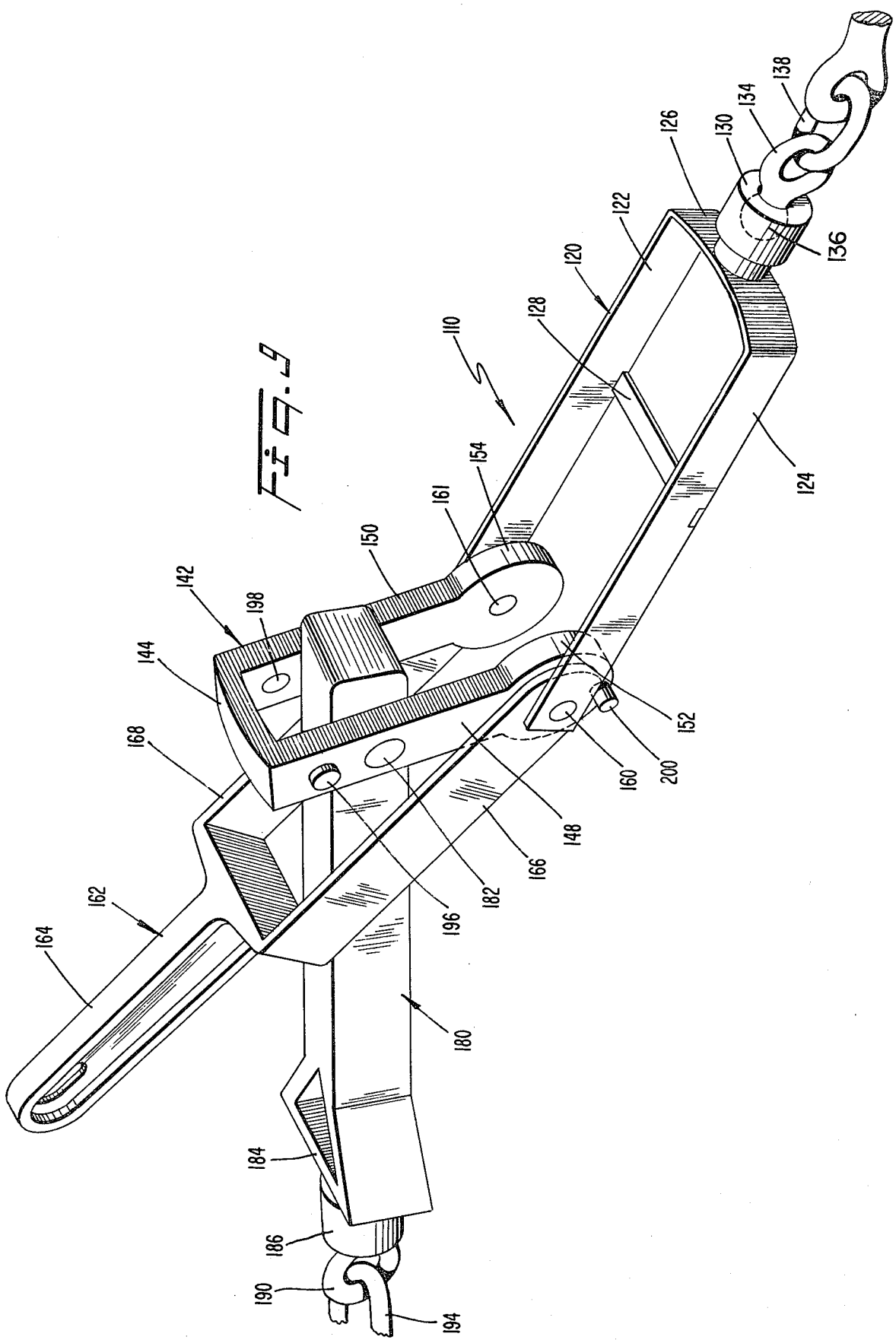

LEVER-TYPE LOAD BINDER

BACKGROUND OF THE INVENTION

The invention disclosed herein pertains generally to load binders, and more particularly to a lever-type load binder having improved safety features.

Load binders are used in a variety of situations to tension a chain or a wire, and are commonly used to secure large heavy loads, such as logs, to flatbed trucks.

Load binders known in the prior art are illustrated, for example, in U.S. Pat. No. 1,518,769 to Brunk. In the Brunk device ends of each of a pair of load engaging draw bars are pivotably connected at different points along a handle member. The device is tensioned by pivoting of the handle member. During the tensioning the handle acts as a lever to provide a mechanical advantage to draw the ends of the binder together. The tension is sustained by setting the device at a dead center. The device is released by rotating the lever in the opposite direction past dead center.

Various other types of load binders are disclosed in the following patents: U.S. Pat. No. 3,826,469 issued to Ratcliff et al; U.S. Pat. No. 3,842,426 issued to Ratcliff et al; U.S. Pat. No. 4,122,587 issued to Weiss et al; U.S. Pat. No. 398,714 issued to Farr; U.S. Pat. No. 1,972,346 issued to Julins; and U.S. Pat. No. 2,539,997 issued to Graves.

A serious problem encountered by users of conventional load binders is "flyback." That is, upon grasping the handle and initially pivoting the lever of a conventional load binder to release the tension, the user of the load binder may be subjected to the danger of being struck by the handle. This danger may arise because the handle is suddenly subjected to the tension force in the chain during release, and, if this tension force is large enough, it will cause the handle to pivot with considerable momentum. Since a user may pull the handle of the load binder toward himself in order to release the load binder, the user may thereby expose himself to the danger of "flyback," i.e., to the danger of being struck by the handle and/or lever pivoting toward the user in an uncontrolled manner.

The danger of flyback is exacerbated in the case of those users who mount lengths of pipe, called "cheaters," on the handles of conventional load binders. By using a cheater, a user effectively increases the length of the lever arm of the load binder, allowing the user to exert a larger tensioning force than he would otherwise be able to exert. As a consequence, however, the handle of the load binder will be subjected to a larger force when the load binder is initially released, resulting in the possibility that the handle and cheater will be propelled toward the user with even greater momentum.

Yet another problem associated with conventional load binders is the difficulty involved in releasing the load binder when the load binder has been used to subject a chain or wire to a relatively large tension. That is, because there is a relatively large tension force in the chain or wire, a user must exert a relatively large force on the handle of the load binder in order to release the load binder.

Accordingly, it is an object of the present invention to provide a simply and inexpensively constructed load binder which can be operated with an advanced degree of safety for the user.

It is another object of the present invention to provide a lever-type load binder which minimizes the danger of flyback.

It is yet another object of the present invention to provide a load binder wherein the actuating handle is used in conjunction with a separate lever element to tension the load binder and wherein the actuating handle may be selectively disengaged from the lever element and employed to trigger the release of the load binder.

It is still another object of the present invention is to provide a lever-type load binder which may be used to subject a chain or wire to a relatively large tension force, may be safely and securely locked in a tensioned configurations and may be released with relatively little effort.

These and other objects and features of the invention will become apparent from the claims and from the following description when read in conjunction with the accompanying drawings.

BRIEF DESCRIPTION OF THE DRAWINGS

Preferred embodiments of the present invention are described with reference to the accompanying drawings wherein like members bear like reference numerals, and wherein:

FIG. 1 is a pictorial view of a first preferred embodiment of a lever-type load binder, according to the present invention;

FIG. 2 is a front view of the embodiment of FIG. 1 showing the relative positions of the components of the first embodiment after a tensioning stroke;

FIG. 3 is a pictorial view of a portion of the embodiment shown in FIG. 1, depicting shoulders at the lower ends of the arms of the actuating means and the tabs connected to the lower ends of the arms of the lever member;

FIG. 4 is a cross-sectional view of the embodiment shown in FIG. 1, taken on the plane 4—4 of FIG. 1, showing the relative positions of the components of the first preferred embodiment of the load binder, according to the present invention, at or near the end of a release stroke;

FIG. 9 is a pictorial view of a second preferred embodiment of a lever-type load binder, according to the present invention.

DETAILED DESCRIPTION

Figure 5:
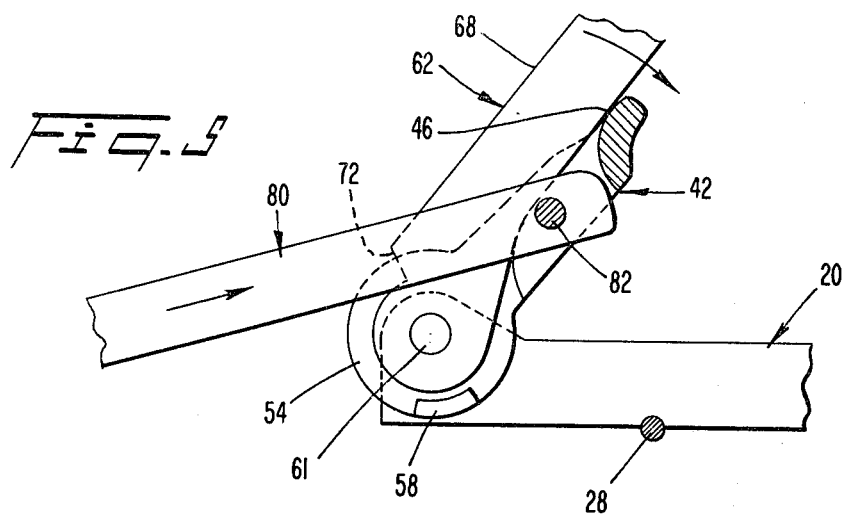
FIG. 5 is a view similar to FIG. 4, showing the relative positions of the components of the first preferred embodiment at the beginning of a tensioning stroke.

A lever-type load binder, according to the present invention, includes a lever member, a draw bar and a clevis, the draw bar and clevis being pivotably attached to opposite ends of the lever member. The draw bar and clevis may each be equipped with hooks to couple the binder to a load. The load binder also includes a pivotable handle for engaging and pivoting the lever member with respect to the clevis and draw bar. The handle engages and pivots the lever member during a tensioning stroke, and triggers the release of the load binder during a return stroke of the handle after the handle has been pivoted out of the path of rotation of the lever member, thus preventing flyback of the handle on release of the load binder.

As used herein the terms "load" or "loads" are intended to refer to a force or forces external to the binder which resist the tensioning of the binder.

Referring first to FIG. 1, an embodiment of a load binder of the present invention is denoted generally by the numeral 10. The binder includes a lever or connecting member 42, having a U-shaped clevis 20 pivotably attached at one end thereof, and a draw bar 80 pivotably attached near the other end thereof. In other words, the clevis 20 and the draw bar 80 are pivotably attached to the lever or connecting member 42 at points displaced from one another. It will be readily apparent from the Figures that relative pivoting of the lever member 42 with respect to the clevis 20 and draw bar 80 will vary the distance between grab hook 40 and grab hook 96. Tensioning of the load binder is effected by rotations of the handle or actuating member 62. When fully tensioned, the load binder may assume the configuration shown in FIG. 2. When released, the load binder may assume the configuration shown in FIG. 4.

With continued reference to FIG. 1, the structure of the illustrated embodiment is described in greater detail. The clevis 20 includes substantially rectangular, parallel arms 22 and 24, as well as a substantially rectangular member 26 arranged transversely with respect to the arms 22 and 24, and connected to one end of each of the arms 22 and 24. The member 26 defines an upper end of the clevis 20. A substantially cylindrical member 28, of relatively small diameter, is arranged transversely with respect to the arms 22 and 24, and is also connected to the arms 22 and 24. The cylindrical member 28 is connected to the arms 22 and 24 at a distance from the top end of the clevis approximately equal to half the length of the arms 22, 24. The cylindrical member 28 defines a stop for the lever member normally beyond the dead center of the lever-type load binder. Dead center occurs when the load binder is tensioned and the forces applied to the load to the clevis 20 and draw bar 80 are colinear and perpendicular to the axes of pivoting of the lever member.

Connected to the top end of the clevis 20 is a ball socket 30. The ball socket 30 receives the ball-shaped end 36 of a link 34. The link 34 is connected by a link 38 to a grab hook 40. The grab hook 40 permits a user to connect one end of the lever-type load binder to a load. The ball and socket joint permits the grab hook to swivel in response to changes in the direcon of forces applied to the load binder.

The generally U-shaped lever member 42 is pivotably connected to an end of the clevis 20. The U-shaped lever member 42 includes a top member 44 having a substantially rectangular engagement surface 46 which faces away from the clevis 20. Two substantially rectangular, parallel legs 48 and 50 are connected to the top member 44. Lower ends 52 and 54 of the legs are disc-shaped. The U-shaped lever member 42 is dimensioned so that it may fit between the arms of the clevis 20. The lever member 42 is pivotably connected to the lower end of the clevis 20 by pivot pins 60 and 61. The pivot pin 60 penetrates through an opening in the lower end of the arm 24 as well as through an opening in the disc-shaped end 52 of the lever member. Likewise, the pivot pin 61 penetrates through an opening in the lower end of the arm 22, as well as through an opening in the disc-shaped end 54. The pivot pins 60 and 61 define a pivot axis about which the lever member 42 may pivot with respect to the clevis 20. The length of the lever member 42 is such that when the lever member is pivoted downwardly toward the clevis 20, the top end 44 will come into contact with the cylindrical stop member 28. Advantageously, the lever member 42 may pivot downwardly toward the clevis 20 at least as far as the dead center of the load binder.

The generally Y-shaped actuating member 62, for engaging and pivoting the lever member 42 with respect to the clevis 20, is also pivotably connected to the lower end of the clevis 20. The Y-shaped actuating member includes a handle 64, as well as two substantially rectangular, parallel arms 66 and 68 which depend from the handle 64. The dimensions of the Y-shaped actuating member 62 are such that the arms 66 and 68 fit between the legs 48 and 50 of the U-shaped lever member 42. The lower ends of each of the arms 66 and 68 of the actuating member 62 have openings, each of which openings receives one of the pivot pins 60, 61. Thus, the Y-shaped actuating member 62 is pivotable with respect to both the lever member 42 and the clevis 20. The length of each of the arms 66 and 68 of the actuating member 62 is greater than the length of the lever member 42. Thus, when the actuating member 62 is pivoted in a clockwise direction (as seen in FIG. 1) with respect to the clevis, the arms 66 and 68 will come into contact with the rectangular engagement surface 46 at the top of the U-shaped lever member 42. It will be readily understood that further pivoting of the actuating member in the clockwise direction will serve to rotate the lever member with respect to the clevis.

The substantially rectangular draw bar 80 is arranged between the arms 66 and 68 of the actuating member 62, as well as between the legs 48 and 50 of the lever member 42. The draw bar 80 is pivotably connected to the lever member 42 at a point adjacent the top 44 of the lever member 42. This pivotable connection is effectuated by pivot pin 82 which projects through openings in the legs 48 and 50 of the lever member 42, as well as through an opening in a lower end of the draw bar 80. A hollow, substantially triangular member 84 is connected to an upper end of the draw bar 80. A ball socket 86, similar to ball socket 30, is connected to the triangular member 84. The ball socket 86 receives a ball-shaped end (not shown) of a link 90. The link 90 is connected by a link 94 to the second grab hook 96. The second grab hook 96 allows a user to connect the draw bar 80 to a load.

With reference to FIG. 3, the lower ends of each of the arms 66 and 68 of the actuating member 62, which lower ends are mounted on the pivot pins 60 and 61, are generally circular in shape. The juncture between the relatively straight portion of the arm 66 and the circular lower end of the arm 66, defines a shoulder 70. Similarly, the juncture between the relatively straight portion of the arm 68 and the lower circular portion of the arm 68 defines a shoulder 72. The diameters of the lower circular portions of the arms 66 and 68 are less than the diameters of the disc-shaped ends 52 and 54 of the legs 48 and 50 of the lever member 42. A tab 56 is connected to an inner surface of the circular member 52, adjacent a peripheral edge surface of the lower circular end of the arm 66. Similarly, a tab 58 is connected to an inner surface of the circular member 54, adjacent a peripheral edge surface of the lower circular end of the arm 68. A counter-clockwise rotation of the arm 66 and 68 of the actuating member 62 results in the shoulders 70 and 72 of the arms 66 and 68 engaging the tabs 56 and 58 connected to the disc-shaped ends 52 and 54 of the lever member 42.

Figure 6:
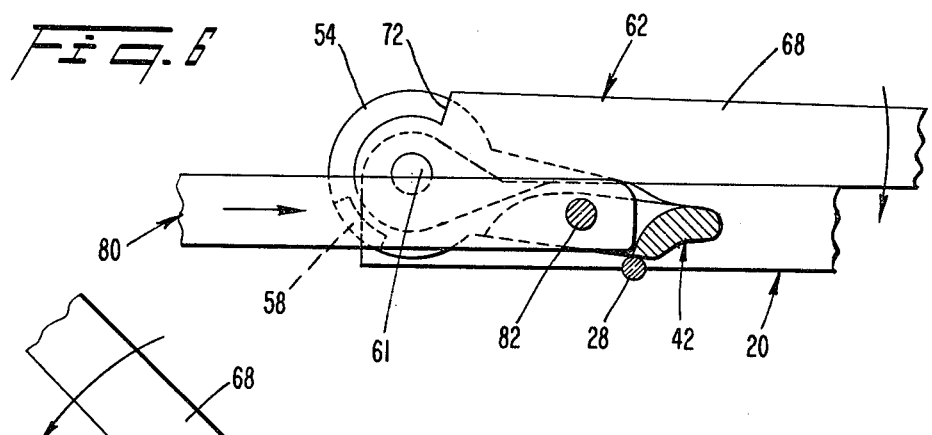
FIG. 6 is a view similar to FIG. 4, showing the relative positions of the components of the first preferred embodiment at the end of a tensioning stroke.

The tensioning of the first embodiment of the lever-type load binder, according to the present invention, will now be described with reference to FIGS. 1, 5 and 6. The grab hooks 40 and 96 may be connected, for example, to opposite ends of a chain to be tensioned. A user may grasp the handle 64 of the actuating member 62 and pivot it in a clockwise direction (as seen in FIGS. 1, 5 and 6) until the arms 66 and 68 of the actuating member 62 come into contact with the engagement surface 46 of the lever member 42 as shown in FIG. 5. The continued clockwise pivoting of the actuating member 62 results in the lever member 42 also being pivoted in the clockwise direction. The clockwise pivoting motion of the lever 42 may continue until the lever 42 comes into contact with, and is stopped by, the cylindrical stop member 28 connected to the arms 22 and 24 of the U-shaped clevis 20, as shown in FIG. 6. As is apparent from the drawings, the path of clockwise tensioning rotation of the lever member is arcuate and substantially perpendicular to the pivoting axis of the lever member. As the lever member 42 is pivoted in the clockwise direction, the draw bar, 80 which is pivotably connected to the lever 42, is drawn toward the clevis 20. Thus, the opposite ends of the chain connected to the grab hooks 40 and 96 are also drawn toward one another, and the chain is thereby tensioned. The relative positions of the various components of the first embodiment of the lever-type load binder, according to the present invention, at the end of a tensioning stroke are shown in FIG. 2. In particular, it is to be noted that the actuating member 62 is in flush contact with the clevis 20 at the end of a tensioning stroke.

Figure 7:
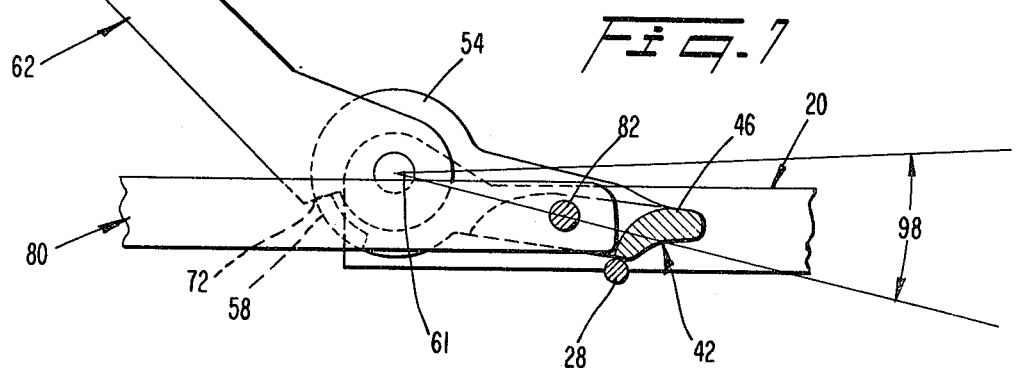
FIG. 7 is a view similar to FIG. 4, showing the relative positions of the components of the first preferred embodiment at the beginning of a release stroke.
Figure 8:
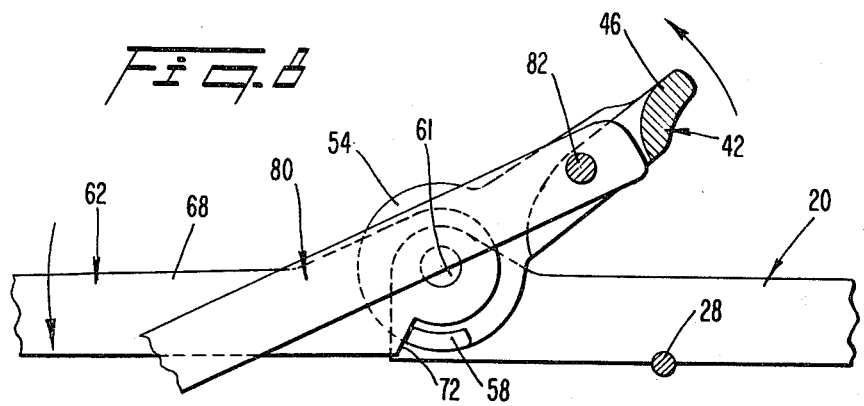
FIG. 8 is a view similar to FIG. 4, showing the relative positions of the components of the first preferred embodiment at the midpoint of a release stroke.

The steps involved in releasing the tension imposed on the chain by the first embodiment of the lever type load binder, according to the present invention, will not be described with reference to FIGS. 1, 7 and 8. To release the load binder, the user once again grasps the handle 64 of the actuating member 62 and pivots the handle in a counter-clockwise direction (as seen in FIGS. 1, 7 and 8). The counter-clockwise pivoting motion of the actuating member 62 is continued until the shoulders 70 and 72 of the arms 66 and 68 of the actuating member 62 engage the tabs 56 and 58 connected to the disc-shaped ends 52 and 54 of the lever member 42 as shown in FIG. 7. Once the shoulders 70 and 72 have engaged the tabs 56 and 58, the user continues to pivot the actuating member 62 in the counter-clockwise direction in order to urge the tabs 56 and 58, and thus the lever member 42, to pivot in the counter-clockwise direction. Once the lever member has been pivoted through a relatively small angular distance 98 from the stop member 28 and past dead center, the tension in the chain may be sufficient to urge the lever member 42 to continue to rotate in the counter-clockwise direction in order to relieve the tension in the chain as shown in FIG. 8 as is apparent from the drawings, the path of counter-clockwise release rotation of the lever member is arcuate and substantially perpendicular to the pivoting axis of the lever member. It is to be noted that as the lever member 42 pivots in the counter-clockwise direction the draw bar 80, which is pivotably connected to the lever member 42, moves away from the clevis 20.

The relative positions of the components of the first embodiment of the lever-type load binder, according to the present invention, at or near the end of a release stroke, are shown in FIG. 4. In particular, it is to be noted that the lever member has pivoted in the counter-clockwise direction through more than ninety-degrees, and that the tabs 56 and 58 are now separated from the shoulders 70 and 72 by a substantial angular distance.

An advantage of the present invention is that to initiate a release stroke, the actuating member 62 must be pivoted by a user in the counter-clockwise direction through a substantial angular distance before the shoulders 70 and 72 even come into contact with the tabs 56 and 58. Thus, the actuating member 62 is pivoted out of the path of the lever member 42 before the lever member 42 even begins to undergo the tension releasing, counter-clockwise pivoting motion. Because the actuating member 62 is separate and distinct from the lever member 42, and because the actuating member 62 is pivoted well out of the path of the lever member 42 at the beginning of a release stroke, the dangers of flyback associated with conventional load binders are avoided.

Once the shoulders 70 and 72 have been pivoted into an engagement with the tabs 56 and 58, only a relatively small force need be applied by a user during a release stroke in order to pivot the lever member 42 through the dead center of the load binder. Once the lever member 42 has been moved off the dead center of the load binder, the tension in a tensioned chain, for example, is sufficient to urge the lever member 42 to continue to pivot in the counter-clockwise direction in order to completely relieve the tension in the chain.

A second preferred embodiment 110 of the lever-type load binder, according to the present invention, is illustrated in FIG. 9. The load binder 110, like the load binder of FIGS. 1–8, also includes a generally U-shaped clevis 120. The clevis 120 includes substantially rectangular, parallel arms 122 and 124. A curved member 126, which is arranged transversely with respect to the arms 122 and 124, and which is connected to one end of the arms 122 and 124, defines a top end of the clevis 120. A cross-bar 128, which is arranged transversely with respect to the arms 122 and 124, and which is connected to the arms 122 and 124 at a point mid-way along the length of the arms 122 and 124, defines a stop for the second embodiment of the lever-type load binder. The cross-bar 128 prevents a lever member 142 from moving far past dead center.

A ball-socket 130, is connected to the top end of the clevis 120. The ball-socket 130 receives the ball-shaped end 136 of a link 134. The link 134 is connected by a chain link 138 to a grab hook (not shown). The grab hook permits a user to connect the clevis 120 to a load.

A generally Y-shaped handle member 162 is pivotably connected to a lower end of the clevis 120. The handle member 162 includes a handle 164, as well as two substantially rectangular, parallel arms 166 and 168 connected to the handle 164. The arms 166 and 168 of the handle member 162 are dimensioned to fit between the arms 122 and 124 of the clevis 120. The lower ends of the arms 166 and 168 of the handle member 162 are pivotably connected to the lower ends of the arms 122 and 124 of the clevis 120 by pivot pins 160 and 161. The pivot pin 160 projects through an opening in the lower end of the arm 124 as well as through an opening in the lower end of the arm 166. The pivot pin 161 projects through an opening in the lower end of the arm 122 as well as through an opening in the lower end of the arm 168. The pivot pins 160 and 161 define a pivot axis about which the handle member 162 may be pivoted with respect to the clevis 120.

The generally U-shaped lever member 142 is also pivotably connected to the lower ends of the arms 122 and 124 of the clevis 120. The lever member 142 includes a curved top member 144, to which is connected two substantially rectangular, parallel legs 148 and 150. The lower ends of each of the legs 148 and 150 are disc-shaped end portions 152, 154, respectively. The lever member 142 is dimensioned so that the legs 148 and 150 may be inserted between the arms 166 and 168 of the Y-shaped handle member 162. The lever member 142 is pivotably connected to the clevis 120 by the pivot pins 160 and 161. The pivot pins 160 and 161 project, respectively, through openings in the arms 124 and 120 the legs 166 and 168 and centers of the disc-shaped ends 152, and 154. Thus, the pivot pins 160 and 161 define a pivot axis about which the lever member 142 may pivot with respect to the clevis 120. It is to be noted that the length of the arms 166 and 168 of the handle member 162 is greater than the length of the legs 148 and 150 of the lever member 142.

A substantially rectangular draw bar 180 is arranged between the arms 166 and 168 of the handle member 162, as well as between the legs 148 and 150 of the lever member 142. A first end of the draw bar 180 is pivotably connected to the legs 148 and 150 of the lever member 142 by a pivot pin 182. The pivot pin 182 passes through apertures in the legs 148 and 150 as well as through an aperture in the draw bar 180. Connected to a second end of the draw bar 180 is a hollow, substantially triangular member 184. A ball-socket 186 is connected to the top of the triangular member 184. A ball-shaped end of a link 190 is received in the ball-socket 186. The link 190 is connected by a chain link 194 to a grab hook (not shown). The grab hook permits a user to connect the draw bar to a load.

A tensioning pin 196 is connected to, and projects outwardly from, an upper end of the leg 148 of the lever member 142. Similarly, a tensioning pin 198 is connected to, and projects outwardly from, the leg 150 of the lever member 142. The tensioning pins 196 and 198 may be engaged by edge surfaces of the arms 166 and 168 of the handle member 162, when the handle member 162 is pivoted in the clockwise direction (as seen in FIG. 9).

The lower ends of the arms 166 and 168, mounted on the pivot pins 160 and 161, are generally semi-circular in shape. The diameters of the semi-circular portions of the arms 166 and 168 are smaller than the diameters of the disc-shaped ends 152 and 154 of the lever member 142. A release pin 200 is connected to, and projects outwardly from, an outer surface of the disc-shaped end 152. The release pin 200 is arranged adjacent to a peripheral edge surface of the semi-circular portion of the arm 166 of the handle member 162. A release pin 202 (not shown) is also similarly attached to the disc-shaped end 154. Thus, when the handle member 162 is pivoted in a counter-clockwise direction the lower edge surfaces of the arms 166 and 168 may engage the release pins 200 and 202.

Assuming that the grab hooks have been connected to, for example, the ends of a chain to be tensioned, the steps involved in tensioning the chain with the second embodiment 110 of the present invention are as follows.

A user grasps the handle 164 of the handle member 162 and pivots the handle member 162 (in a clockwise direction in FIG. 9) until the upper edge surfaces of the arms 166 and 168 engage the tensioning pins 196 and 198. The continued clockwise motion of the handle member 162 results in the lever member 142 also being pivoted in the clockwise direction. The lever member 142 will continue to pivot in the clockwise direction past dead center until the lever member 142 comes into contact with, and is stopped by, the cross bar 128. As the lever member pivots in the clockwise direction, the draw bar 180 will be drawn toward the clevis 120, thereby tensioning the chain. In addition, as the lever member 142 is pivoted in the clockwise direction the release pins 200 and 202 will also pivot in the clockwise direction to a position where they may be engaged by the handle member 162 during a release stroke.

In order to release the tension on the chain, the user grasps the handle 164 and pivots the handle member 162 in a counter clockwise direction until the lower edge surfaces of the arms 166 and 168 engage the release pins 200 and 202. The continued rotation of the handle member 162 in the counter clockwise direction will result in the release pins 200 and 202, and thus the lever member 142, also being pivoted in the counter clockwise direction. Once the lever member 142 is moved counter-clockwise past its dead center, the tension in the chain will be sufficient to urge the lever member 142 to continue to pivot in the counter clockwise direction in order to completely relieve the tension in the chain.

An advantage of the second embodiment of the present invention, like the first embodiment, is that at the initiation of a release stroke the handle member 162 is pivoted out of the path of the lever member 142 even before the lever member 142 begins to pivot counterclockwise away from dead center. Thus, the second embodiment avoids the problem of flyback.

The principles, preferred embodiments and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the present invention.

What is claimed is:

1. A lever-type load binder comprising:
   a lever member;
   first means for engaging the load binder to a first load, said first means being pivotably attached to said lever member at a first point;
   second means for engaging the load binder to a second load, said second means being pivotably attached to said lever member at a second point, displaced from said first point;
   an actuating handle, pivotable in a first direction about a pivot axis passing through the lever member, for contacting and pivoting said lever member with respect to said first and second engaging means during a tensioning stroke of the handle and pivotable about said pivot axis in a second, opposite direction for triggering the release of the load binder by engaging said lever member with said handle at a point displaced from said pivot axis after the handle has been pivoted in the second direction substantially out of the path of rotation of said lever member, to prevent flyback of the handle on release of the load binder due to rotation of the lever member.

2. The lever-type load binder according to claim 1 wherein said first engaging means includes stop means for stopping the pivoting of the lever member past a dead center of the load binder when the lever member is pivoted by the actuating means during a tensioning stroke.

3. The lever-type load binder according to claim 2 wherein said lever member is contacted by the handle at a location displaced from a common pivot axis of the lever member and handle, to pivot the lever member through dead center and against the stop means during the tensioning strke of the handle.

4. The lever-type load binder according to claim 1 wherein one of said lever member and said actuating means includes at least one tab, by means of which the handle and lever member contact one another during a latter part of a return stroke of the handle in the second direction to pivot the lever member off dead center and, thereby, release the load binder.

5. A lever-type load binder comprising:
a lever member;
first means for engaging the load binder to a first load, which first means is pivotably connected to said lever member to enable said lever member to pivot with respect to said first engaging means about a pivot axis;
second means for engaging the load binder to a second load, which second engaging means is pivotably connected to said lever member at a point displaced from the point of attachment of said first engaging means; and
actuating means for pivoting said lever member about said pivot axis, said actuating means being pivotably connected to said first engaging means and pivotable with respect to said lever member.

6. The lever-type load binder according to claim 5, wherein said engaging means further includes:
at least one pin connected to a first end of the lever member and at least one pin connected to a second end of the lever member, the pivot axis being arranged between said pins;
said actuating means being pivotably attached to said first engaging means and said lever member so that the actuating means, first engaging means, and lever member are pivotable about said pivot axis; and
said actuating means engaging the at least one pin connected to the first end of the lever upon a rotation of the handle means in a first direction during a tensioning stroke of the actuating means, and said actuating means engaging the at least one pin connected to the second end of the lever upon a rotation of the handle means in a second direction during a return stroke of the handle means.

7. The lever-type load binder according to claim 5 wherein said first engaging means includes:
a generally U-shaped clevis having first and second arms; and
a stop means on at least one of said first and second arms, for stopping rotation of said lever member when said lever member is engaged and pivoted by said actuating means about said pivot axis during a tensioning stroke.

8. The lever-type load binder according to claim 7 wherein said lever member includes a generally U-shaped member having first and second legs, the first leg of the U-shaped member being pivotably connected to the first arm of the clevis at a first pivot point, and the second leg of the U-shaped member being pivotably connected to the second arm of the clevis at a second pivot point.

9. The lever-type load binder according to claim 8 wherein said lever member includes:
at least one pin connected to a first end of the first leg of the U-shaped member and at least one pin connected to a second end of the first leg of the U-shaped member, the first pivot point arranged between said pins;
at least one pin connected to a first end of the second leg of the U-shaped member and at least one pin connected to a second end of the second leg of the U-shaped member, the second pivot point arranged between said pins; and wherein said actuating means includes
a generally Y-shaped handle having first and second arms, the first arm of said handle being pivotably connected to the first arm of the clevis at said first pivot point, and the second arm of said handle being pivotably connected to the second arm of the clevis at said second pivot point, the legs of the U-shaped member arranged between the arms of the handle;
said arms of said handle engaging the pins connected to the first ends of the legs of the U-shaped member upon a rotation of the handle in a first direction during a tensioning stroke of the handle, and said arms of said handle engaging the pins connected to the second ends of the legs of the U-shaped member upon a rotation of the handle in a second direction during a return stroke of handle.

10. The lever-type load binder according to claim 8 wherein said lever member includes:
a cross-link connecting said first and second legs of said generally U-shaped member at a first end of said U-shaped member, which cross-link includes a generally rectangular surface;
a first tab connected to said first leg of said U-shaped member at a second end of said U-shaped member, said first pivot point arranged between said rectangular surface and said first tab;
a second tab connected to said second leg of said U-shaped member at the second end of said U-shaped member, said second pivot point arranged between said rectangular surface and said second tab; and wherein said actuating means includes
a generally Y-shaped handle having first and second arms, the first arm of said handle being pivotably connected to the first arm of the clevis at said first pivot point, and the second arm of said handle being pivotably connected to the second arm of the clevis at said second pivot point, the arms of the Y-shaped handle arranged between the legs of the U-shaped member;
said first arm of said handle including a first shoulder arranged adjacent said first tab;
said second arm of said handle including a second shoulder arranged adjacent said second tab;
said arms of said handle engaging said rectangular surface upon a rotation of the handle in a first direction during a tensioning stroke of said handle, and said shoulders of the arms of said handle engaging said tabs upon a rotation of the handle in a second direction during a return stoke of said handle.

11. A lever-type force transmitter comprising:
a lever member;
first means for engaging the transmitter to, and for transmitting a force to, a first load, said first means being attached to said lever member for pivoting about a pivot axis;
second means for engaging the transmitter to, and for transmitting a force to, a second load, said second means being pivotably attached to said lever member at a point displaced from the point of attachment of said first means;
actuating means, pivotable about the pivot axis, for engaging and pivoting said lever member with respect to said first and second means during a force transmission stroke, said actuating means being configured to be pivoted substantially out of the path of rotation of said lever member before the force transmitter is released to prevent flyback of the actuating means.

12. A lever-type load binder comprising:
a lever member;
first means for engaging the load binder to a first load, said first means being pivotably attached to said lever member;
second means for engaging a second load, said second engaging means being attached to said lever member at a point displaced from the point of attachment of said first engaging means;
an elongated actuating handle pivotably attached to the lever member, and extending outwardly from the lever member a distance substantially greater than the length of the lever member to provide a mechanical advantage during a tensioning stroke of the handle, said actuating handle being pivotable about an axis with respect to the lever member in a first direction wherein it is engageable with means on the lever member for rotating the lever member through a dead center position during the tensioning stroke; and said actuating handle being pivotable about its point of attachment with the lever member in a second, opposite direction with respect to the lever member through a return stroke to a position of engagement with means on the lever member displaced from the axis of pivoting of the handle for triggering the release of the lever member over dead center.

13. A lever-type load binder;
a first means for transmitting a force to the load;
a second means for transmitting a force, substantially opposite in direction of the first force, to the load;
an elongated means for actuating the load-binder; and
means for connecting said first and second transmitting means and said actuating means;
wherein said first and second transmitting means are pivotably connected to said connecting means at points displaced from one another and said actuating means is pivotably connected to the connecting means, said connecting means having a length approximately equal to the distance of separation between the points of connection of said first and second transmitting means to said connecting means;
wherein said actuating means is substantially greater in length than said connecting means, and provides a mechanical advantage to facilitate rotation of the connecting means over center to effect tensioning of the load binder; and
wherein at least one of said connecting means and said actuating means is formed with a member by which the actuating means and connecting means couple with one another during a latter part of a return stroke of the actuating means to rotate the connecting means over dead center and, thereby, release the load binder, without the actuating means participating in the rotation of the connecting means over dead center.

* * * * *